United States Patent
Suzuki et al.

(10) Patent No.: US 9,370,844 B2
(45) Date of Patent: Jun. 21, 2016

(54) RECTANGULAR BATTERY AND RECTANGULAR BATTERY MANUFACTURING METHOD

(71) Applicants: Satoshi Suzuki, Toyota (JP); Toshiya Okada, Toyota (JP)

(72) Inventors: Satoshi Suzuki, Toyota (JP); Toshiya Okada, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/410,148

(22) PCT Filed: Apr. 24, 2013

(86) PCT No.: PCT/JP2013/062129
§ 371 (c)(1),
(2) Date: Dec. 22, 2014

(87) PCT Pub. No.: WO2014/002600
PCT Pub. Date: Jan. 3, 2014

(65) Prior Publication Data
US 2015/0318517 A1    Nov. 5, 2015

(30) Foreign Application Priority Data

Jun. 28, 2012    (JP) .................................. 2012-145124

(51) Int. Cl.
| | |
|---|---|
| H01M 2/08 | (2006.01) |
| B23K 26/20 | (2014.01) |
| H01M 2/02 | (2006.01) |
| B23K 15/00 | (2006.01) |
| B23K 26/26 | (2014.01) |
| H01M 2/04 | (2006.01) |
| B23K 26/28 | (2014.01) |
| B23K 33/00 | (2006.01) |
| H01M 2/20 | (2006.01) |
| H01M 2/30 | (2006.01) |

(52) U.S. Cl.
CPC ........... *B23K 26/206* (2013.01); *B23K 15/0006* (2013.01); *B23K 15/0046* (2013.01); *B23K 26/20* (2013.01); *B23K 26/26* (2013.01); *B23K 26/28* (2013.01); *B23K 33/00* (2013.01); *H01M 2/024* (2013.01); *H01M 2/0217* (2013.01); *H01M 2/0426* (2013.01); *H01M 2/20* (2013.01); *H01M 2/30* (2013.01)

(58) Field of Classification Search
None
See application file for complete search history.

(56) References Cited

U.S. PATENT DOCUMENTS

| | | | | |
|---|---|---|---|---|
| 2002/0150817 A1* | 10/2002 | Grubb | ..................... | H01M 2/30 429/178 |
| 2006/0088761 A1* | 4/2006 | Ota | ......................... | H01M 2/18 429/130 |

(Continued)

FOREIGN PATENT DOCUMENTS

| | | |
|---|---|---|
| JP | H11-219688 A | 8/1999 |
| JP | 2001-135282 A | 5/2001 |
| JP | 2011-204396 A | 10/2011 |

*Primary Examiner* — Patrick Ryan
*Assistant Examiner* — Jose Colucci Rios
(74) *Attorney, Agent, or Firm* — Kenyon & Kenyon LLP

(57) ABSTRACT

A battery case of a rectangular battery includes a lid member welded to an opening portion in a main body member. Each opening rounded portion of the opening portion has, in the circumferential direction, a support projecting portion which projects inward over the entire opening rounded portion and which supports the lid member. Meanwhile, in the circumferential direction along an entire opening short side portion, the opening short side portion has a low projecting portion which projects inward at a position lower than the support projecting portion in the depth direction of the main body member.

16 Claims, 14 Drawing Sheets

(56) References Cited

U.S. PATENT DOCUMENTS

| | | | |
|---|---|---|---|
| 2006/0121344 A1* | 6/2006 | Amagai | H01M 2/0285 429/176 |
| 2011/0081573 A1* | 4/2011 | Kim | H01M 2/0202 429/186 |
| 2012/0079713 A1* | 4/2012 | Hosokawa | H01M 2/0473 29/623.2 |

* cited by examiner

RECTANGULAR BATTERY AND RECTANGULAR BATTERY MANUFACTURING METHOD

CROSS-REFERENCE TO RELATED APPLICATIONS

This is a US national phase application based on the PCT International Patent Application No. PCT/JP2013/062129 filed on Apr. 24, 2013, and claiming the priority of Japanese Patent Application No. 2012-145124 filed on Jun. 28, 2012, the entire contents of which are herewith incorporated by reference.

TECHNICAL FIELD

The present invention relates to a rectangular battery including an electrode body enclosed in a rectangular parallelepiped battery case made of metal and a method for manufacturing this rectangular battery.

BACKGROUND ART

Batteries such as lithium ion secondary batteries are used in various fields, e.g., in vehicles such as a hybrid vehicle, a plug-in hybrid vehicle, and an electric vehicle, household electric devices such as a notebook-sized personal computer, and industrial devices such an impact driver. One example of these batteries is known as a rectangular battery including an electrode body enclosed in a metal battery case having a rectangular parallelepiped outer shape, to be concrete, a rectangular battery in which a main body member having a bottom-closed rectangular cylindrical shape and a lid member inserted in an opening portion of the main body member, which are hermetically sealed by welding (see each figure of Patent Document 1). This Patent Document 1 discloses that an outer vessel (a main body member) is formed with projections at four opening corners in order to prevent dropping of a lid (a lid member) into the outer vessel.

RELATED ART DOCUMENTS

Patent Documents

Patent Document 1: JP-A-11(1999)-219688

SUMMARY OF INVENTION

Problems to be Solved by the Invention

When the projections are formed at the four opening corners as in the outer vessel disclosed in Patent Document 1, it is certainly possible to prevent dropping of the lid. However, if a clearance or gap is present between the opening portion of the outer vessel (the main body member) and the lid (the lid member), a laser beam may enter the inside of the outer vessel during laser welding, thereby possibly damaging the electrode body.

On the other hand, it is conceivable to form shoulder portions in the opening portion of the outer vessel (the main body member) over a predetermined range to support the lid (the lid member). However, it is difficult to form the shoulder portions at the same position in a depth direction of the outer vessel in the predetermined range. If the height of the shoulder portions from the bottom of the vessel varies, the support height of the lid may vary or the lid may be supported in an inclined position. On the other hand, as disclosed in FIG. 5 of Patent Document, it is also conceivable to provide an engagement piece around the lid. In this case, however, a laser beam is irradiated from the side during laser welding and thus the case and the lid are not easily welded (see (0004), (0005) of Patent Document 1).

The present invention has been made in view of the circumstances and has a purpose to provide a rectangular battery including a battery case configured by welding an opening portion of a main body member and a lid member inserted therein to each other in a predetermined range by an energy beam while the lid member is supported within the opening portion of the main body member, the battery being prevented from defects caused by a laser beam entering the battery case through a clearance between the opening portion of the main body member and the lid member, and a method for manufacturing this rectangular battery.

Means of Solving the Problems

To achieve the above purpose, one aspect of the invention provides a rectangular battery including a rectangular parallelepiped battery case made of metal and an electrode body enclosed in the battery case, wherein the battery case includes: a bottom-closed rectangular cylindrical main body member having a rectangular opening portion defined by a pair of opening long-side portions, a pair of opening short-side portions, and four opening rounded portions each curved to connect the opening long-side portions to the opening short-side portions; and a rectangular plate-like lid member inserted in the opening portion to close the opening portion, the lid member including a lid peripheral edge portion defined by a pair of lid long-side portions placed respectively to face the pair of opening long-side portions, a pair of lid short-side portions placed respectively to face the pair of opening short-side portions, and four lid rounded portions placed respectively to face the four opening rounded portions, wherein, in the opening portion of the main body member, the four opening rounded portions each include a support projecting portion projecting inward over the corresponding entire opening rounded portion in a circumferential direction of the opening portion to support the lid member inserted in the opening portion, the pair of opening short-side portions each include a low projecting portion projecting inward over the entire opening short-side portion in the circumferential direction of the opening portion, each of the low projecting portions being positioned lower in a depth direction of the main body member than the support projecting portions, the four opening rounded portions and the four lid rounded portions have clearances one each between each opening rounded portion and the corresponding lid rounded portion, and are welded to each other by an energy beam irradiated to the lid member from outside in a thickness direction of the lid member, and the pair of opening short-side portions and the pair of lid short-side portions have a clearance at least either between the one opening short-side portion and the one lid short-side portion or between the other opening short-side portion and the other lid short-side portion, and are welded to each other by the energy beam.

In this battery case of the rectangular battery, the lid member inserted in the opening portion of the main body member is supported in such a way that the support projecting portions of the opening rounded portions are engaged in the lid rounded portions. The opening short-side portions have the low projecting portions positioned to be lower than the support projecting portions. Thus, the low projecting portions neither contact with the lid short-side portions of the lid member nor interfere with supporting of the lid member by the opening rounded portions, and therefore do not change the position of the lid member in the depth direction of the main body member (which is a direction perpendicular to the bottom of the main body member and is also simply referred to as "depth direction"). Accordingly, the position of the lid member in the depth direction can be appropriately determined for welding.

In addition, the support projecting portion of each opening rounded portion projects inward over each entire opening rounded portion in the circumferential direction of the opening portion (also simply referred to as "circumferential direction"). When the energy beam is irradiated to the lid member from outside in the thickness direction of the lid member to weld the opening rounded portions and the lid rounded portions, this energy beam impinges on each support projecting portion even if the energy beam enters the main body member through the clearance between each opening rounded portion and the corresponding lid rounded portion. This can prevent the energy beam from directly entering the main body member. Accordingly, it is possible to reduce defects such as damage to the electrode body due to entrance of the energy beam into the main body member during welding between the opening rounded portions and the lid rounded portions.

In addition, the low projecting portion of each opening short-side portion projects inward over each entire opening short-side portion in the circumferential direction. When the energy beam is irradiated to the lid member from outside in the thickness direction thereof to weld the opening short-side portions to the lid short-side portions, this energy beam impinges on the low projecting portions even if the energy beam enters the main body member through the clearance between the opening short-side portion and the lid short-side portion. This also enables preventing direct entrance of the energy beam into the main body member. Accordingly, it is possible to prevent defects such as damage to the electrode body due to entrance of the energy beam into the main body member during welding between the opening short-side portions and the lid short-side portions. Thus, in this rectangular batter, even though the clearances are provided one each between the opening rounded portions and the lid rounded portions and between the opening short-side portions and the lid short-side portions, defects such as damage to the electrode body due to entrance of the energy beam can be suppressed.

The support projecting portions provided in the opening rounded portions each have the shape and the size capable of engaging with the lid rounded portions of the lid member and supporting the lid member. The support projecting portions may be formed only in the opening portion or only in the opening portion and the vicinity thereof in the depth direction. As an alternative, the support projecting portions may extend to the bottom of the main body member. Each of the support projecting portions supporting the lid rounded portions of the lid member preferably includes a flat surface perpendicular to the depth direction (a flat surface perpendicular to the inner circumferential surface of the opening rounded portion). This is because even when the lid rounded portions of the lid member supported by the support projecting portions are displaced from each other in the direction perpendicular to the depth direction, the position of the lid member in the depth direction is less likely to be changed.

On the other hand, the low projecting portions provided in the opening short-side portions are configured to project inward at a position lower in the depth direction than the support projecting portions (concretely, portions of the lid member supporting the lid rounded portions) inward. The low projecting portions may be formed only in the opening portion or only in the opening portion and the vicinity thereof in the depth direction. As an alternative, the low projecting portions may extend to the bottom of the main body member. The low projecting portions may also be configured such that the surface facing in an opposite direction (an outward direction) to the depth direction is a flat surface perpendicular to the depth direction (a flat surface perpendicular to the inner circumferential surface of the opening short-side portion) or a slant surface being lower on a more inward side. In a case of the slant surface, however, the inclination angle thereof is preferably set to 45 degrees or less. This is because the energy beam reflected by this slant surface is less likely to enter the main body member.

The "energy beam" used for welding may include a laser beam, an electronic beam, and others. The laser used herein may include a CW laser such as a fiber laser, and a pulse laser such as a YAG laser.

Furthermore, in the above rectangular battery, preferably, the support projecting portions each have a projecting size larger than the clearance between each opening rounded portion and the corresponding lid rounded portion, and the low projecting portions each have a projecting size larger than the clearance between each opening short-side portion and the corresponding lid short-side portion.

In the above rectangular battery, the projecting size of each support projecting portion is set larger than the clearances one each between the opening rounded portions and the lid rounded portions and the projecting size of each low projecting portion is set larger than the clearances one each between the opening short-side portions and the lid short-side portions. Accordingly, the energy beam irradiated to the lid member from outside in the thickness direction thereof during welding inevitably impinges on the support projecting portions and the low projecting portions. This can effectively suppress the defects such as damage to the electrode body due to direct entrance of the energy beam into the main body member. Thus, the battery can provide high reliability.

Furthermore, in one of the above rectangular batteries, preferably, the support projecting portions each include a support flat surface extending perpendicular to the depth direction over each entire opening rounded portion in the circumferential direction to support the lid member, the low projecting portions each include a low slant surface projecting obliquely inward from a same position as the support flat surfaces over each entire opening short-side portion in the circumferential direction so that position of the low slant surface in the depth direction is lower on a more inward side, and each low slant surface forms an angle $\alpha$ with the support flat surface is 45 degrees or less.

In the above rectangular battery, each of the low projecting portions includes the low slant surface over the entire opening short-side portion in the circumferential direction. Each of the low slant surfaces is positioned lower than the support flat surfaces of the support projecting portions and does not contact with the lid member. The position of the lid member in the depth direction is not changed by the low projecting portions. On the other hand, two support projecting portions and one low projecting portion interposed therebetween are configured such that the low slant surface is interposed between two support flat surfaces. Even though the low slant surface is formed, differences in position and shape from the two support flat surfaces can be reduced. Accordingly, it is possible to easily form the low slant surface between the two support flat surfaces by squeezing work, press work, or others. This can produce a main body member at low cost and hence a battery at low cost. In addition, since the inclination angle $\alpha$ of each low slant surface (an angle with the support flat surface) is set to 45 degrees or less, the energy beam reflected by the low slant surface during welding is less likely to enter the main body member. Consequently, a battery with the electrode body appropriately prevented from damages can be achieved.

The inclination angle α of each low slant surface is preferably set to 45 degrees or less as explained above, and more preferably to 30 degrees or less. This is because the energy beam reflected by each low slant surface during welding is less likely to enter the main body member.

Furthermore, in one of the above rectangular batteries, preferably, the opening portion of the main body member and the lid peripheral edge portion of the lid member are hermetically welded to each other over the entire circumference of the lid member while the pair of the opening long-side portions and the pair of the lid long-side portions are placed in close contact with each other.

The pair of opening long-side portions each have no portion projecting inward. In the above battery, however, the pair of opening long-side portions and the pair of lid long-side portions are placed in close contact state and hermetically welded to each other over the entire circumference of the lid member. This can prevent the energy beam from entering the main body member during welding of the opening long-side portions and the lid long-side portions. This battery can provide higher reliability.

Another aspect of the invention provides a method for manufacturing a rectangular battery including a rectangular parallelepiped battery case made of metal and an electrode body enclosed in the battery case, wherein the battery case includes: a bottom-closed rectangular cylindrical main body member having a rectangular opening portion defined by a pair of opening long-side portions, a pair of opening short-side portions, and four opening rounded portions each curved to connect the opening long-side portions to the opening short-side portions; and a rectangular plate-like lid member inserted in the opening portion to close the opening portion, the lid member including a lid peripheral edge portion defined by a pair of lid long-side portions placed respectively to face the pair of opening long-side portions, a pair of lid short-side portions placed respectively to face the pair of opening short-side portions, and four lid rounded portions placed respectively to face the four opening rounded portions, wherein, in the opening portion of the main body member, the four opening rounded portions each include a support projecting portion projecting inward over the corresponding entire opening rounded portion in a circumferential direction of the opening portion to support the lid member inserted in the opening portion, the pair of opening short-side portions each include a low projecting portion projecting inward over the entire opening short-side portion in the circumferential direction of the opening portion, each of the low projecting portions being positioned lower in a depth direction of the main body member than the support projecting portions, the four opening rounded portions and the four lid rounded portions have clearances one each between each opening rounded portion and the corresponding lid rounded portion, and are welded to each other by an energy beam irradiated to the lid member from outside in a thickness direction of the lid member, and the pair of opening short-side portions and the pair of lid short-side portions have a clearance at least either between the one opening short-side portion and the one lid short-side portion or between the other opening short-side portion and the other lid short-side portion, and are welded to each other by the energy beam, wherein the method includes: an insertion-support step of inserting the lid member in the opening portion of the main body member so that the lid rounded portions of the lid member are supported by the support projecting portion of the opening rounded portions of the main body member; and a welding step of irradiating the energy beam to respectively weld the four opening rounded portions to the four lid rounded portions, and respectively weld the pair of the opening short-side portions to the lid short-side portions, while the clearances are generated one each between the four opening rounded portions and the four lid rounded portions and the clearance is generated at least either between the one opening short-side portion and the one lid short-side portion or between the other opening short-side portion and the other lid short-side portion.

According to the above method for manufacturing a rectangular battery, in the insertion-support step, when the lid member is inserted in the opening portion of the main body member, the support projecting portions of the opening rounded portions are engaged one each in the lid rounded portions and thus the lid member is supported in the opening portion. Each of the opening short-side portions includes the low projecting portion positioned lower than the support projecting portions. Therefore, the low projecting portions neither contact with the lid short-side portions of the lid member not interfere with supporting of the lid member of the opening rounded portions. Thus, the position of the lid member in the depth direction is not changed. Accordingly, it is possible to appropriately determine the position of the lid member in the depth direction and perform the welding step.

In addition, the support projecting portion of each opening rounded portion projects inward over each entire opening rounded portion in the circumferential direction. In the welding step, therefore, when the energy beam is irradiated to the lid member from outside in the thickness direction thereof to weld the opening rounded portions and the lid rounded portions while the clearances are formed one each between the opening rounded portions and the lid rounded portions, the energy beam impinges on the support projecting portion. This can prevent the energy beam from directly entering the main body member. Accordingly, it is possible to reduce defects such as damage to the electrode body due to entrance of the energy beam into the main body member during welding between the opening rounded portions and the lid rounded portions.

In addition, the low projecting portion of each opening short-side portion projects inward over each entire opening short-side portion in the circumferential direction. In the welding step, when the energy beam is irradiated to the lid member from outside in the thickness direction thereof to weld the opening short-side portions to the lid short-side portions while the clearance is generated at least either between the one opening short-side portion and the one long-side portion short-side portion or between the other opening short-side portion and the other long-side portion short-side portion, the energy beam impinges on the low projecting portion. This also enables preventing direct entrance of the energy beam into the main body member. Accordingly, it is possible to prevent defects such as damage to the electrode body due to entrance of the energy beam into the main body member during welding between the opening short-side portion and the lid short-side portion. Thus, even though the clearances are present one each between the opening rounded portion and the lid rounded portion and between the opening short-side portions and the lid short-side portions, defects such as damage to the electrode body due to entrance of the energy beam can be suppressed.

In the above rectangular battery manufacturing method, preferably, the support projecting portions each have a projecting size larger than the clearance between each opening rounded portion and the corresponding lid rounded portion, and the low projecting portions each have a projecting size larger than the clearance between each opening short-side portion and the corresponding lid short-side portion.

According to the method for manufacturing a rectangular battery, the projecting size of each support projecting portion is set larger than the clearances one each between the opening rounded portions and the lid rounded portions and the projecting size of each low projecting portion is set larger than the clearances one each between the opening short-side portions and the lid short-side portions. In the welding step, therefore, the energy beam irradiated to the lid member from outside in the thickness direction thereof inevitably impinges on the support projecting portion and the low projecting portion. This can effectively suppress the damage to the electrode body due to direct entrance of the energy beam into the main body member. Thus, the rectangular battery with high reliability can be manufactured.

In one of the above rectangular battery manufacturing methods, preferably, the support projecting portions each include a support flat surface extending perpendicular to the depth direction over each entire opening rounded portion in the circumferential direction to support the lid member, the low projecting portions each include a low slant surface projecting obliquely inward from a same position as the support flat surfaces over each entire opening short-side portion in the circumferential direction so that position of the low slant surface in the depth direction is lower on a more inward side, and each low slant surface forms an angle α with the support flat surface is 45 degrees or less.

According to the rectangular battery manufactured by the above manufacturing method, each low projecting portion includes the low slant surface over the entire opening short-side portion in the circumferential direction. Each of the low slant surfaces is positioned lower than the support flat surfaces of the support projecting portions and does not contact with the lid member. Thus, the position of the lid member in the depth direction is not changed by the low projecting portions. On the other hand, the two support projecting portions and the low projecting portion located therebetween are configured such that the low slant surface is interposed between the two support flat surfaces. Even though the low slant surface is formed, differences in position and size from the two support flat surfaces can be reduced. Accordingly, it is possible to easily form the low slant surface between the two support flat surfaces by squeezing, press work, or others. This can produce a main body member at low cost and hence a battery at low cost. In addition, since the inclination angle α of each low slant surface (an angle with the support flat surface) is set to 45 degrees or less, the energy beam reflected by the low slant surface during welding is less likely to enter the main body member. Consequently, a battery with the electrode body appropriately prevented from damages can be manufactured.

In one of the above rectangular battery manufacturing methods, preferably, the welding step is a step of hermetically welding the opening portion and the lid peripheral edge portion over the entire circumference while the pair of opening long-side portions are compressed to each other so that the opening long-side portions and the lid long-side portions are placed in close contact with each other.

When the lid member is to be inserted in the opening portion of the main body member in the insertion-support step, if the peripheral edge portion of the lid member collides or strongly contacts with the opening portion, foreign subjects such as metal powder may occur and drop into the main body member, which may cause short circuit or the like. When the main body member is in a free state (a state with no pressure or restraint), e.g., when the main body member is formed such that the interval between the pair of the opening long-side portions in the opening portion is larger than the interval between the pair of lid long-side portions in the lid member, the size relationship generating a clearance between each opening long-side portion and the corresponding lid long-side portion may be established. In such a state, however, while the opening portion and the lid peripheral edge portion are welded to each other, the energy beam may directly enter the main body member through the clearance between the opening long-side portion and the lid long-side portion and cause defects such as damage to the electrode body. According to the above manufacturing method, in contrast, the opening portion and the lid peripheral edge portion are hermetically welded to each other over the entire circumference while the opening long-side portion and the lid long-side portion are placed in close contact with each other. This can prevent the energy beam from directly entering the main body member and further reduce a possibility that causes defects such as damage to the electrode body.

MODE FOR CARRYING OUT THE INVENTION

Figure 1:
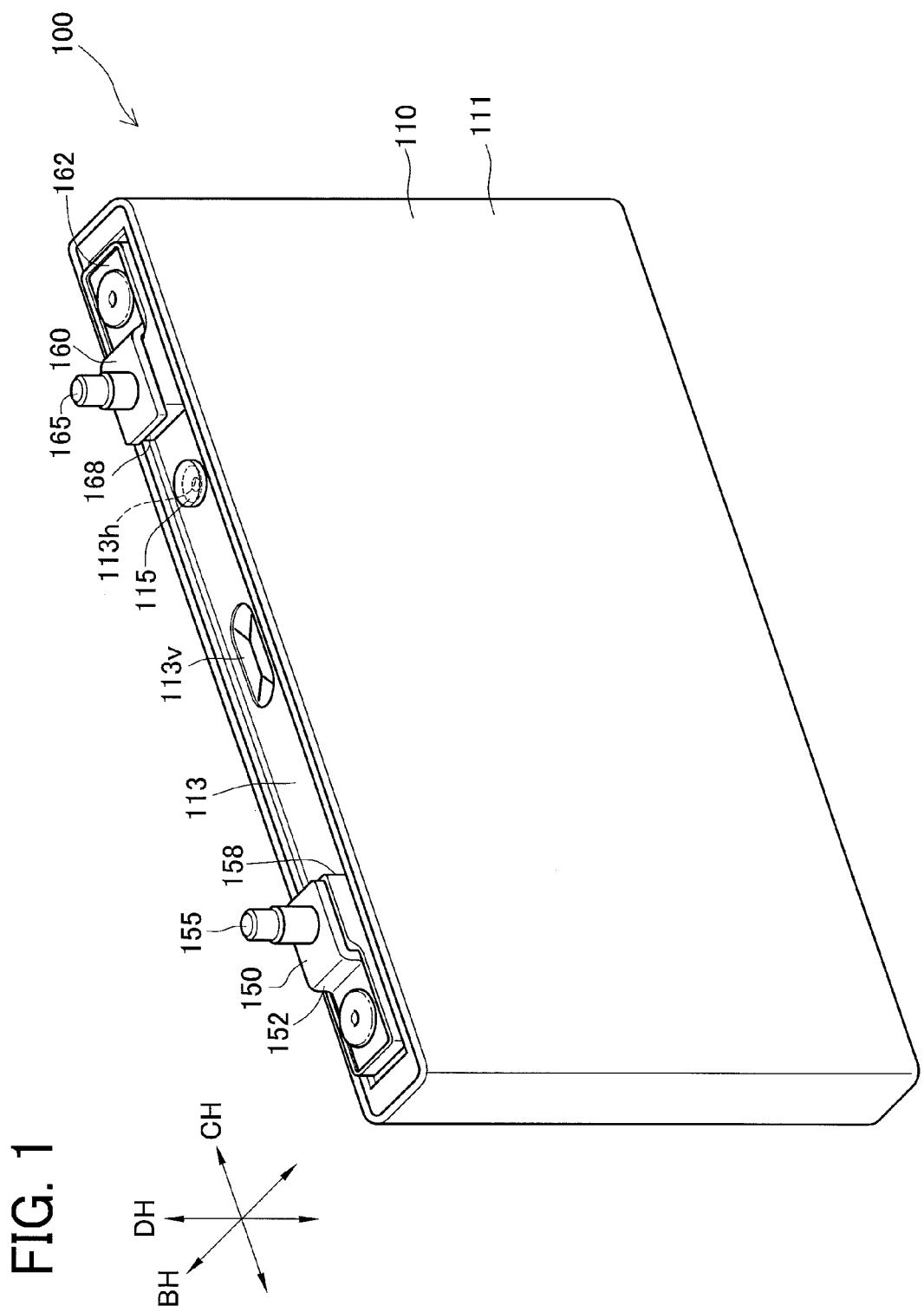
FIG. 1 is a perspective view of a lithium ion secondary battery in an embodiment.
Figure 2:
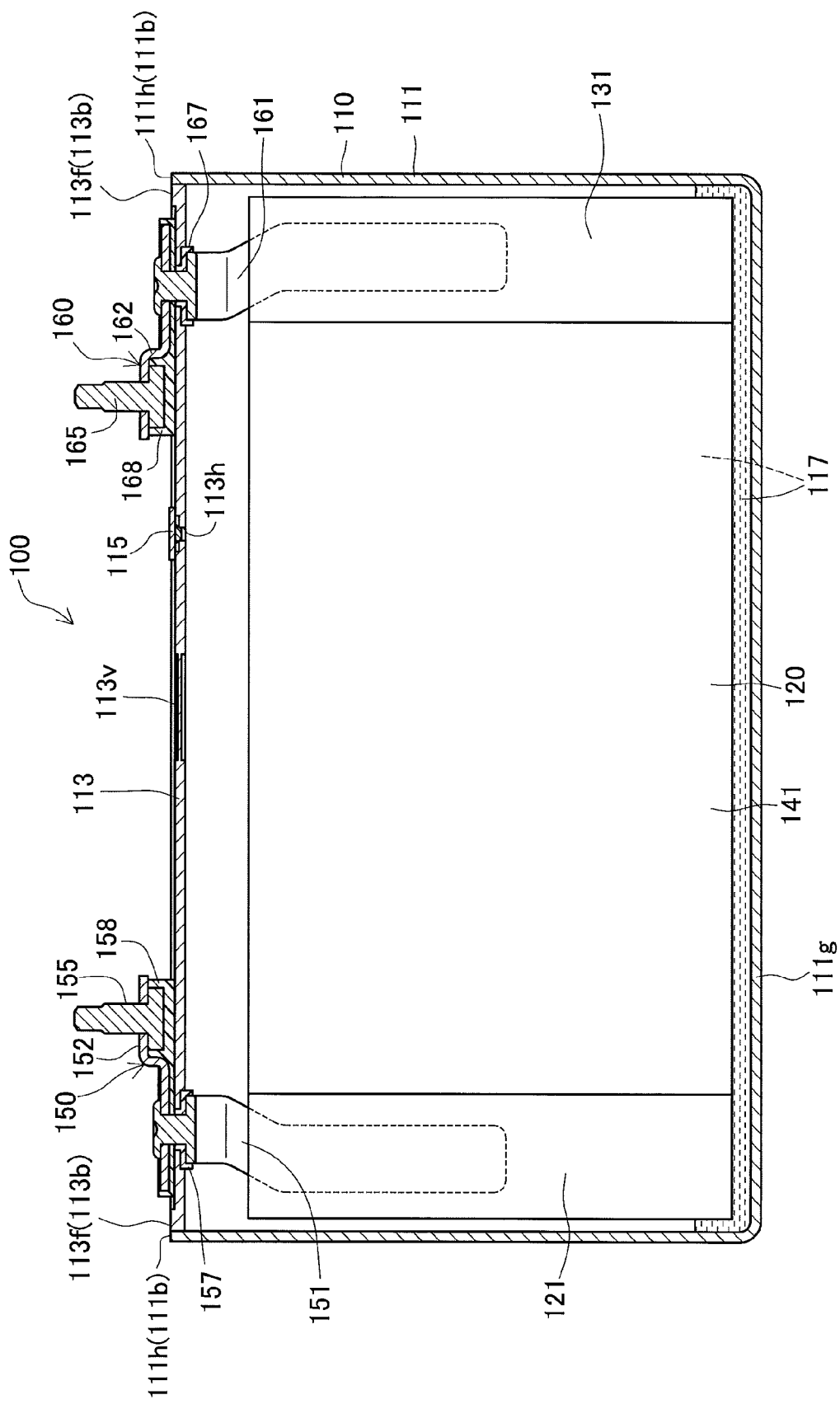
FIG. 2 is a vertical cross sectional view of the lithium ion secondary battery in the embodiment.
Figure 3:
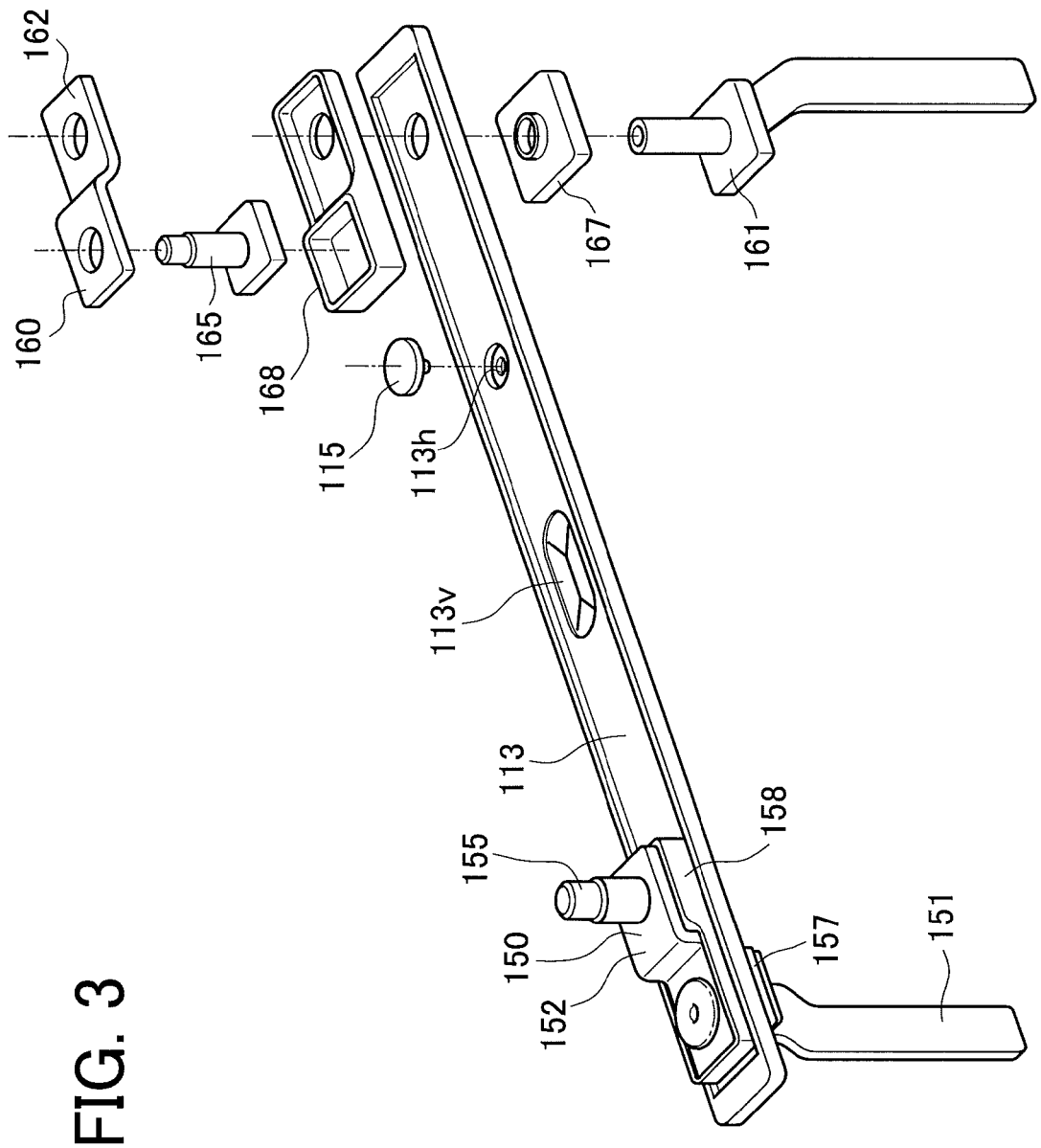
FIG. 3 is an exploded perspective view of a lid member, a positive terminal, a negative terminal, and others in the embodiment.
Figure 4:
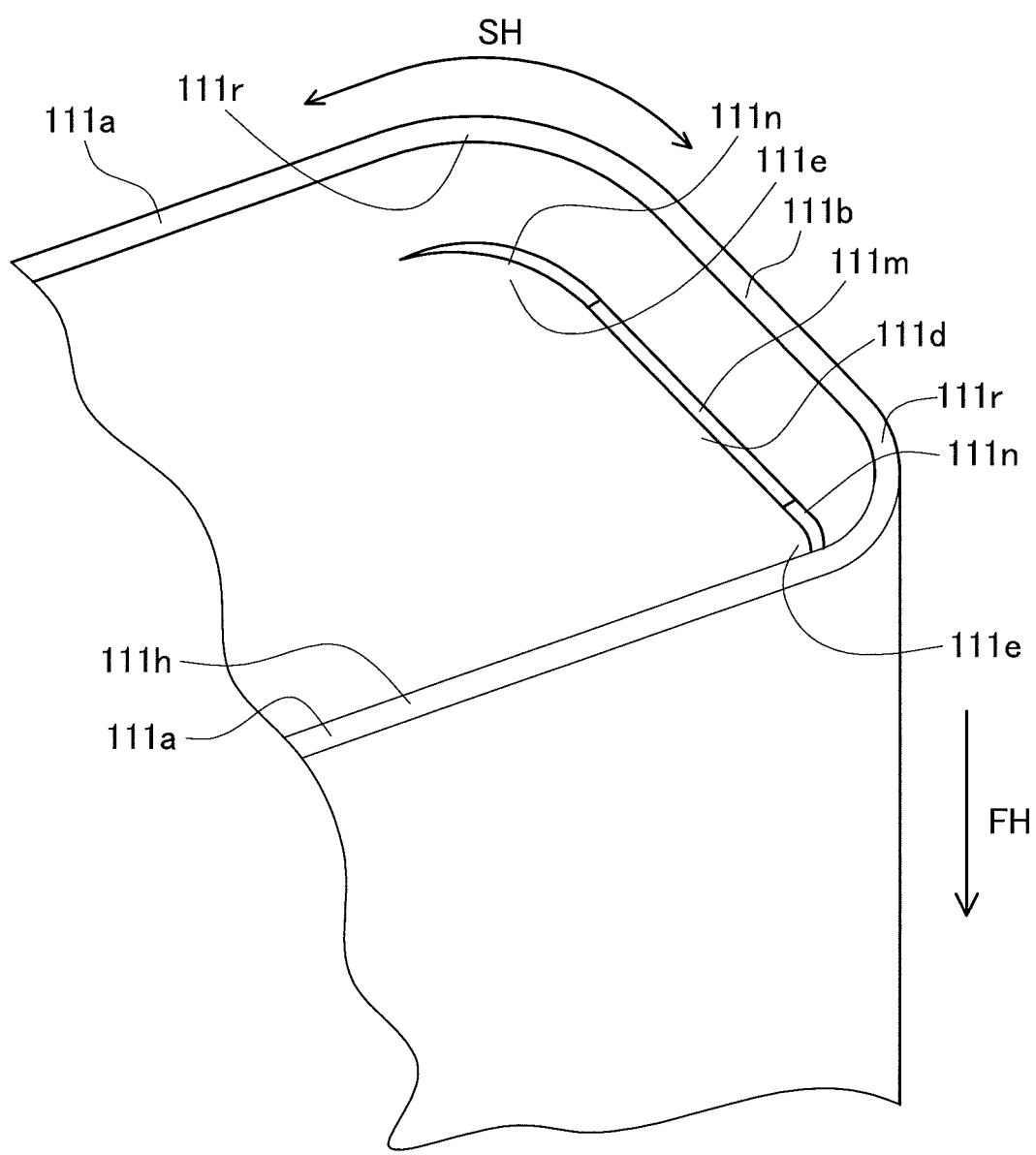
FIG. 4 is a partial perspective view of a main body member forming a battery case in the embodiment.
Figure 5:
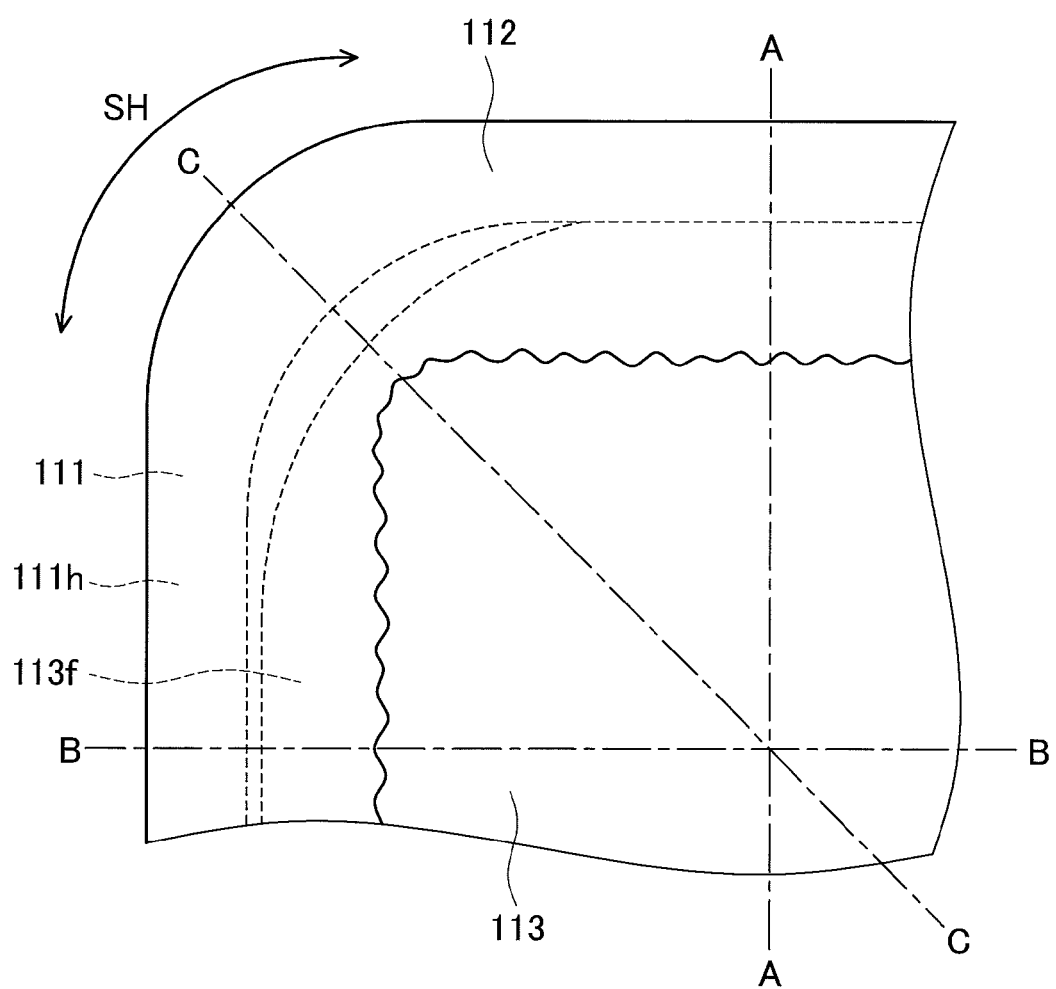
FIG. 5 is an enlarged plan view, seen from above, an opening portion and a lid peripheral edge portion welded to each other in the embodiment.
Figure 6:
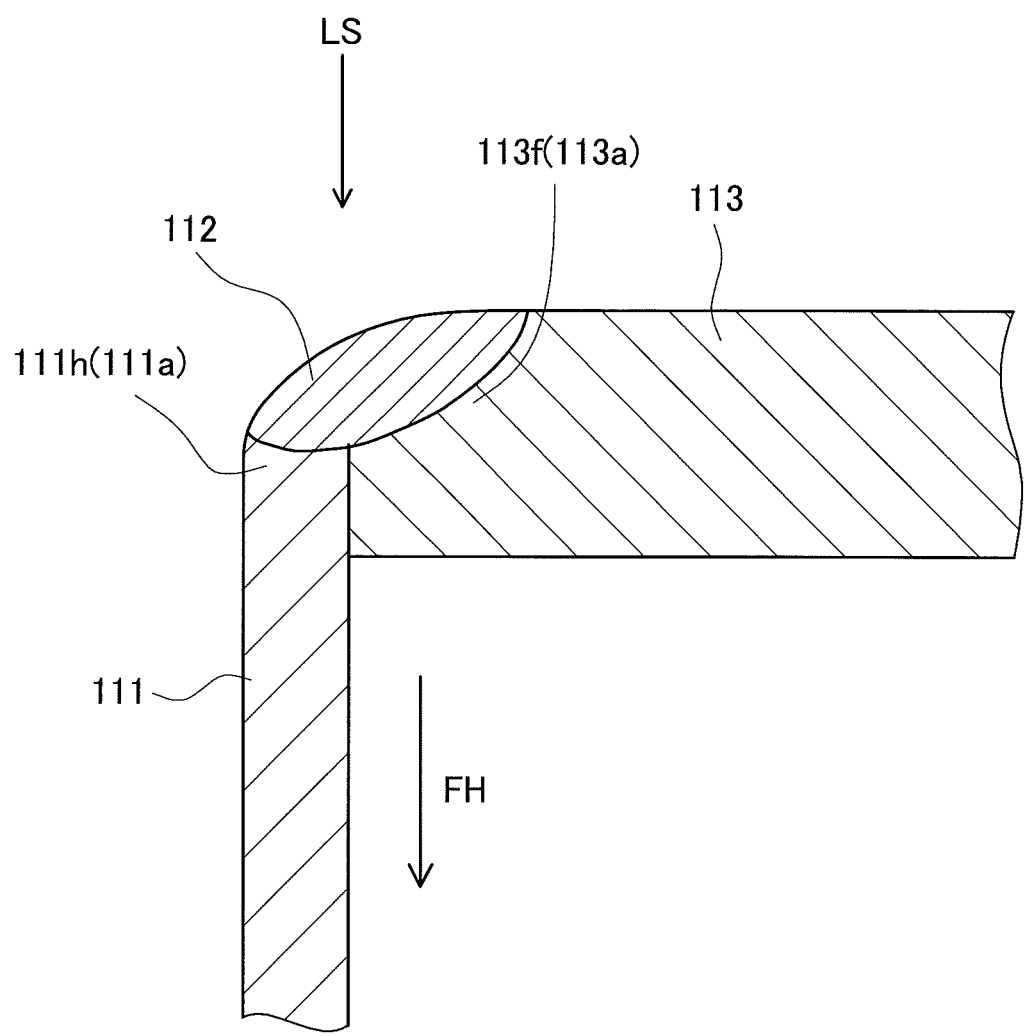
FIG. 6 is a partial enlarged cross sectional view showing the vicinity of an opening long-side portion and a lid long-side portion, taken along a line A-A in FIG. 5, in the embodiment.
Figure 7:
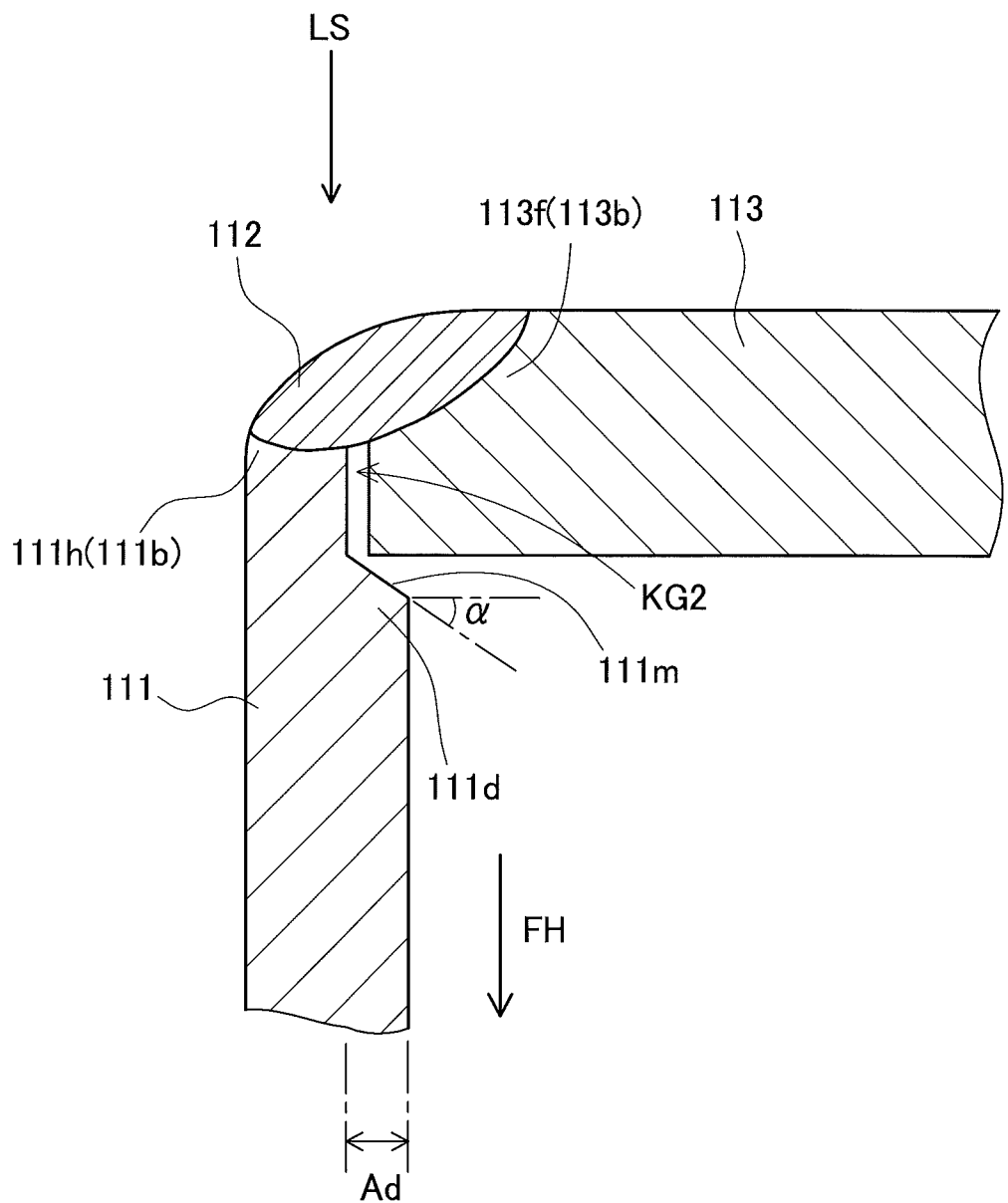
FIG. 7 is a partial enlarged cross sectional view showing the vicinity of an opening short-side portion and a lid short-side portion, taken along a line B-B in FIG. 5, in the embodiment.
Figure 8:
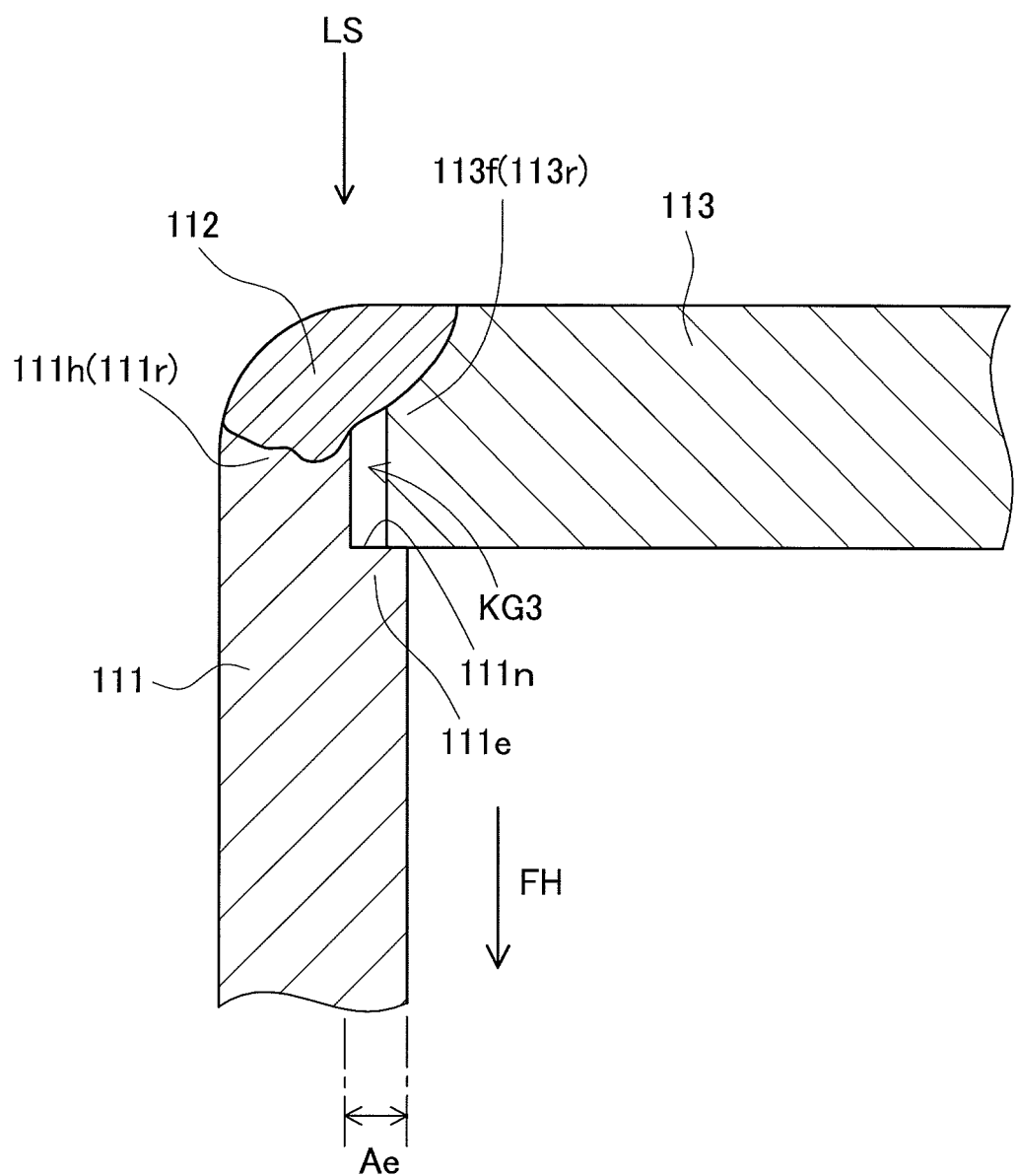
FIG. 8 is a partial enlarged cross sectional view showing an opening rounded portion and a lid rounded portion, taken along a line C-C in FIG. 5, in the embodiment.

A detailed description of a preferred embodiment of the present invention will now be given referring to the accompanying drawings. FIGS. 1 and 2 show a lithium ion secondary battery 100 (hereinafter, also simply referred to as a battery 100) in the present embodiment. FIG. 3 shows a lid member 113, a positive terminal 150, a negative terminal 160, and others. FIG. 4 shows a main body member 111 of a battery case 110. Furthermore, FIGS. 5 to 8 show the vicinity of an opening portion 111h of the main body member 111 and a lid member peripheral edge portion 113f of the lid member 113 of the battery case 110. The following explanation is given under the assumption that a thickness direction BH, a width direction CH, and a height direction DH of the battery 100 are determined as illustrated in FIGS. 1 and 2. The upper side in FIGS. 1 and 2 is referred to as an upper side of the battery 100 and the lower side in FIGS. 1 and 2 is referred to as a lower side.

This battery 100 is a rectangular sealed battery to be mounted in a vehicle such as a hybrid vehicle and an electric vehicle, and a battery using device such as a hammer drill. This battery 100 includes the battery case 110 having a rectangular parallelepiped shape, an electrode body 120 wound in a flattened shape and enclosed in the battery case 110, the positive terminal 150 and the negative terminal 160 both supported on the battery case 110, and others (see FIGS. 1 and 2). In the battery case 110, a non-aqueous electrolyte 117 is retained.

The electrode body 120 is contained sideways in the battery case 110 so that an axis line (a winding axis) of the electrode body 120 is parallel to the width direction CH of the battery 100 (see FIG. 2). This electrode body 120 is formed in such a way that a strip-shaped positive sheet 121 and a strip-shaped negative sheet 131 are overlapped each other by interposing two strip-shaped separators 141, 141 therebetween, and wound together about the axial line, and compressed into a flattened shape. Part of the positive sheet 121 in the width direction protrudes in a spiral form on one side in the axial direction (a left side in FIG. 2) from the separators 141, 141 and is connected to the aforementioned positive terminal (positive terminal member) 150. Part of the negative sheet 131 in the width direction protrudes in a spiral form on the other side in the axial direction (a right side in FIG. 2) from the separators 141, 141 and is connected to the aforementioned negative terminal (negative terminal member) 160.

The battery case 110 will be explained below. This battery case 110 is made of metal (concretely, aluminum). The battery case 110 includes the main body member 111 having a bottom-closed rectangular cylindrical shape including the rectangular opening portion 111h only on the upper side, and the rectangular-plate-like lid member 113 that is inserted in the opening portion 111h of the main body member 111 to close the opening portion 111h (see FIGS. 1 to 4).

The rectangular opening portion 111h of the main body member 111 includes a pair of opening long-side portions 111a, 111a, a pair of opening short-side portions 111b, 111b, and four opening rounded portions 111r, 111r curved to connect between those corresponding long-side portions 111a and short-side portions 111b (see FIGS. 4 to 8).

Each of the opening rounded portions 111r includes a support projecting portion 111e projecting inward over each entire opening rounded portion 111r in a circumferential direction SH of the opening portion 111h to support from below a lid rounded portion 113r of a lid peripheral edge portion 113f mentioned later of the inserted lid member 113. This support projecting portion 111e is configured to include a support flat surface 111n for supporting the lid rounded portion 113r of the lid member 113 from below and also to extend to a bottom 111g of the main body member 111. The support flat surface 111n is a flat surface (a flat surface perpendicular to the inner circumferential surface of the opening rounded portion 111r) perpendicular to the depth direction FH of the main body member 111 over the entire opening rounded portion 111r in the circumferential direction SH. Since the lid rounded portions 113r of the lid member 113 are supported by the thus configured support flat surfaces 111n, the position of the lid member 113 in the depth direction FH is less likely to change even when the lid rounded portions 113r are displaced in the direction perpendicular to the depth direction FH.

On the other hand, each of the opening short-side portions 111b includes a low projecting portion 111d that is positioned lower than (below) the support projecting portions 111e in the depth direction FH and projects inward over each entire opening short-side portion 111b in the circumferential direction SH of the opening portion 111h. This low projecting portion 111d is configured to have a low slant surface 111m that does not contact with the lid member 113 and extends to the bottom 111g of the main body member 111. The low slant surface 111m is a flat surface that projects obliquely inward in the depth direction FH from the same position as the support flat surface 111n along the entire opening short-side portion 111b in the circumferential direction SH so that the position of the slant surface 111m in the depth direction FH (the slant surface 111m on the more inward side slopes down) is lower on the more inward side. An inclination angle α of the low slant surface 111m (an angle with the support flat surface 111n) is 45 degrees or less (α=45° in the present embodiment).

At a portion near the center of the lid member 113 in its longitudinal direction (the width direction CH of the battery 100), there is provided a non-return safety valve 113v (see FIGS. 1 and 3). Near this safety valve 113v, a liquid inlet 113h is provided to be used for injection of the electrolyte 117 into the battery case 110. This inlet 113h is hermetically sealed by a sealing member 115. At portions near both ends of the lid member 113 in the longitudinal direction, there are fixedly provided the positive terminal (a positive terminal member) 150 and the negative terminal (a negative terminal member) 160 each extending from inside to outside of the battery case 110.

To be concrete, those positive terminal 150 and negative terminal 160 are respectively connected to the electrode body 120 within the battery case 110, while first terminal members 151, 161 penetrating through the lid member 113 to extend out of the battery case 110, and crank-shaped second terminal members 152, 162 placed on the lid member 113 and fixed by caulking or swaging to the first terminal members 151, 161. The positive terminal 150 and the negative terminal 160 are fixed to the lid member 113 together with metal fastening members 155, 165 serving to fasten the terminals 150 and 160 to external connecting terminals such as a bus bar or crimping terminal, through first insulating members 157, 167 made of resin and placed inside the lid member 113 (inside the case) and second insulating members 158, 168 made of resin and placed outside the lid member 113 (outside the case).

The lid peripheral edge portion 113f of the lid member 113 includes a pair of lid long-side portions 113a 113a, a pair of lid short-side portions 113b, 113b, and four lid rounded portions 113r, 113r curved like an arc to connect the lid long-side portions 113*a* and the lid short-side portions 113*b* (see FIGS. 5 to 8). The lid long-side portions 113*a*, 113*a* respectively face the opening long-side portions 111*a* and 111*a* of the main body member 111. The lid short-side portions 113*b*, 113*b* respectively face the opening short-side portions 111*b*, 111*b* of the main body member 111. The lid rounded portions 113*r*, 113*r* are respectively opposite the opening rounded portions 111*r*, 111*r* of the main body member 111.

Figure 9:
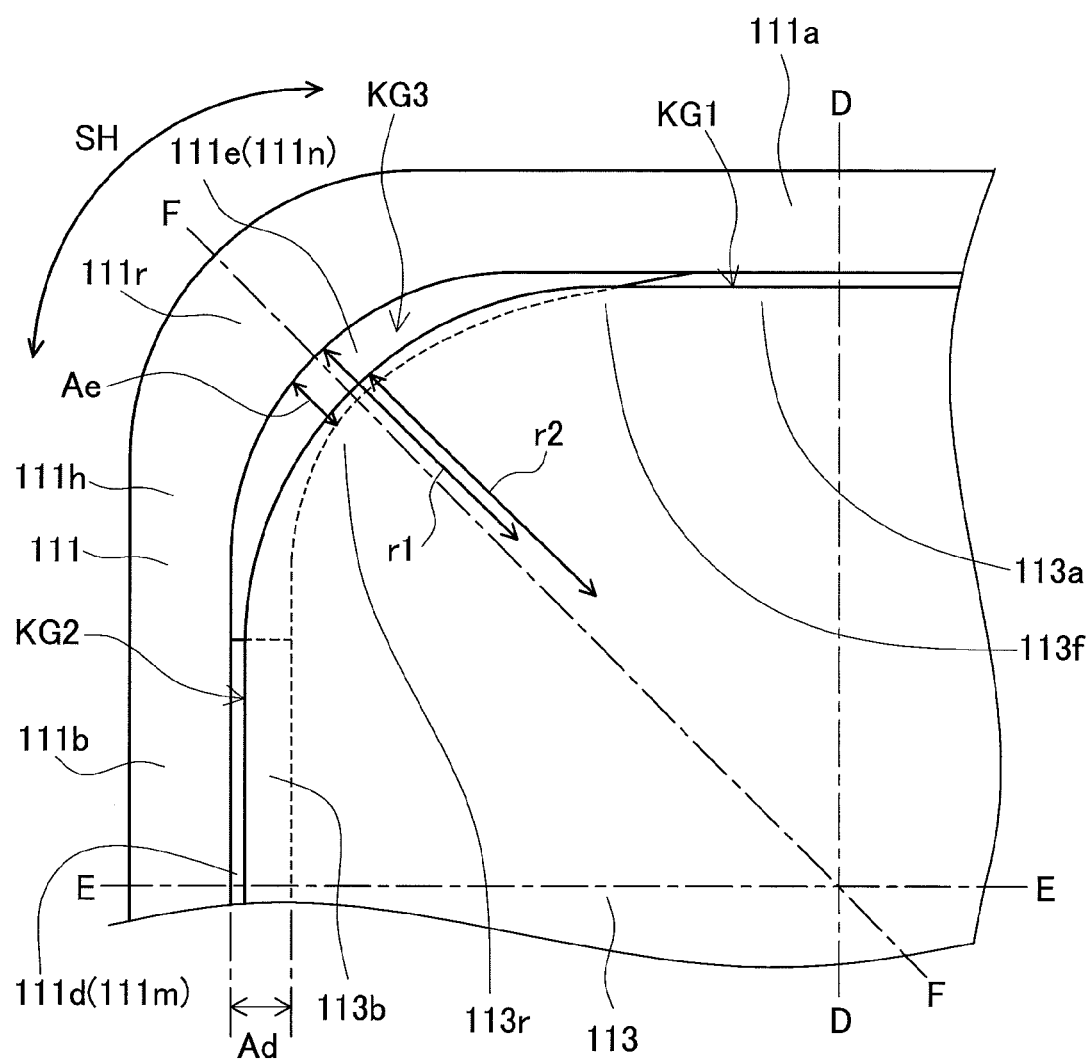
FIG. 9 is an explanatory view showing a relationship between the opening portion of the main body member and the lid member inserted in the opening portion in the embodiment.
Figure 10:
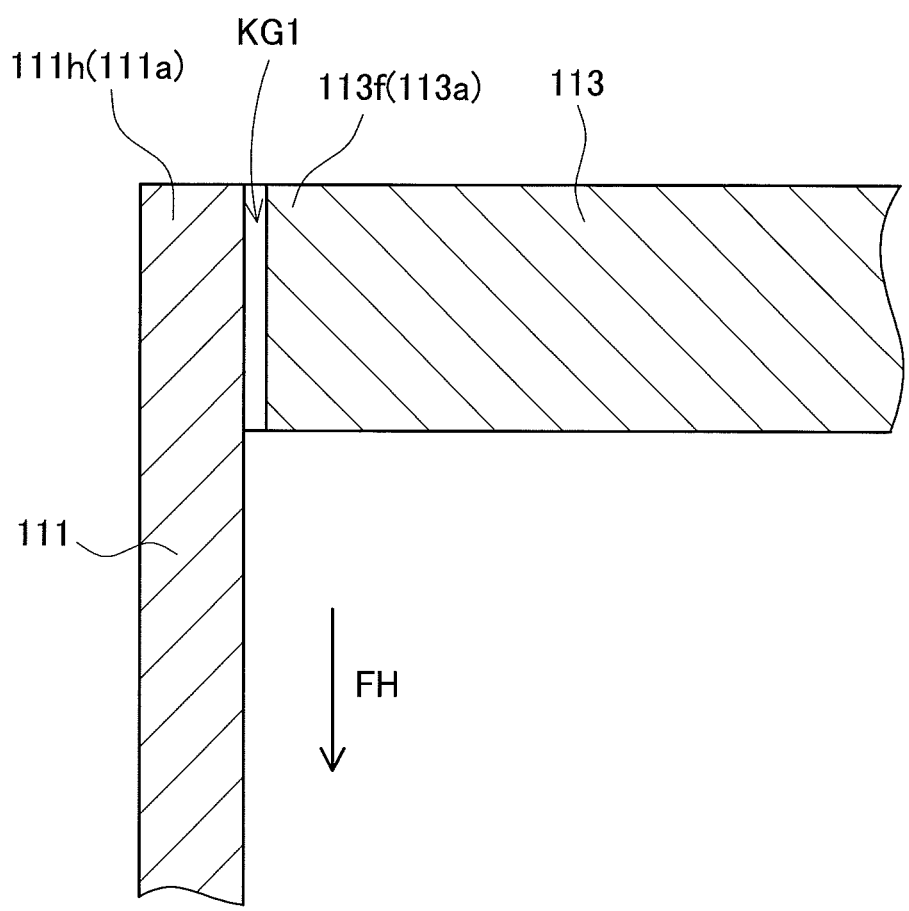
FIG. 10 is an explanatory view showing the vicinity of the opening long-side portion and the lid long-side portion, taken along a line D-D in FIG. 9, in the embodiment.
Figure 11:
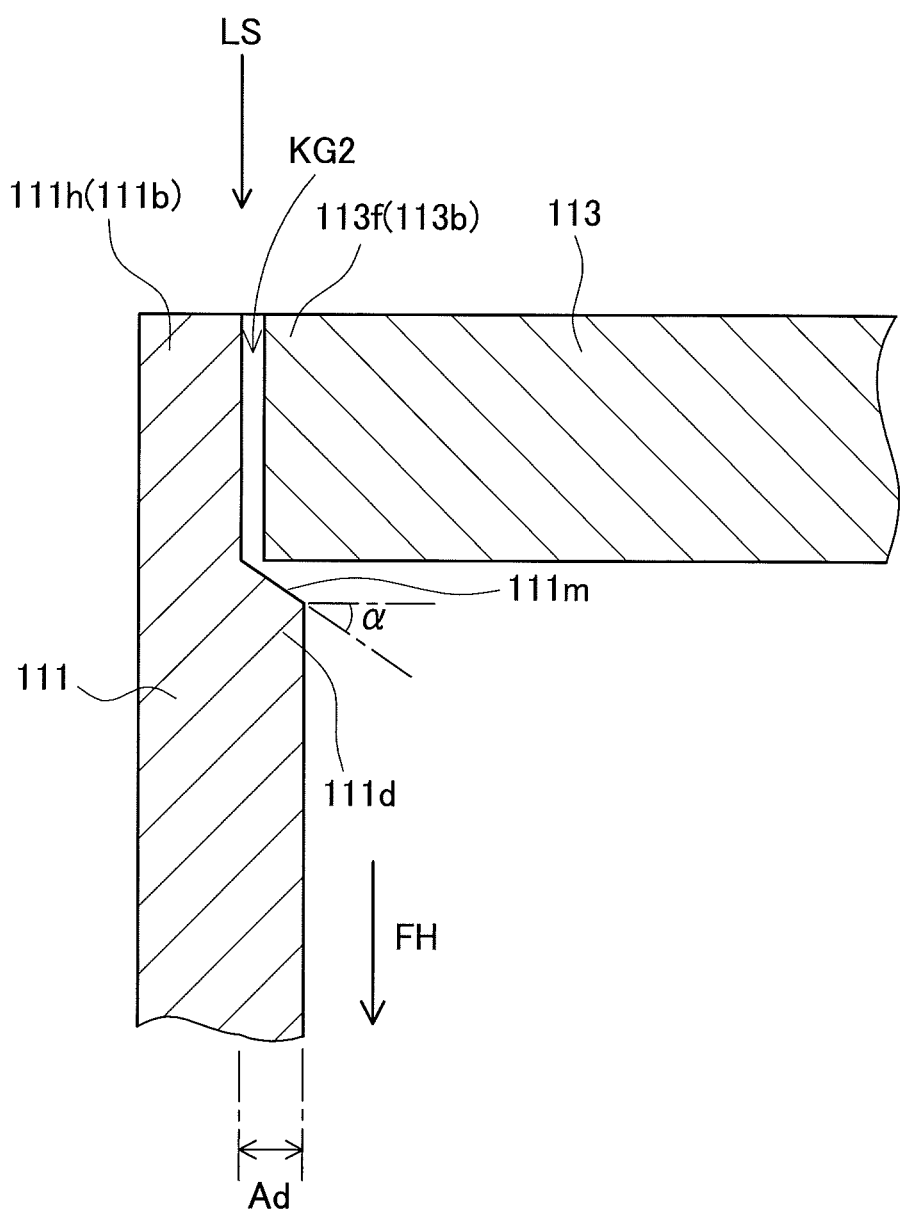
FIG. 11 is an explanatory view showing the vicinity of the opening short-side portion and the lid short-side portion, taken along a line E-E in FIG. 9, in the embodiment.
Figure 12:
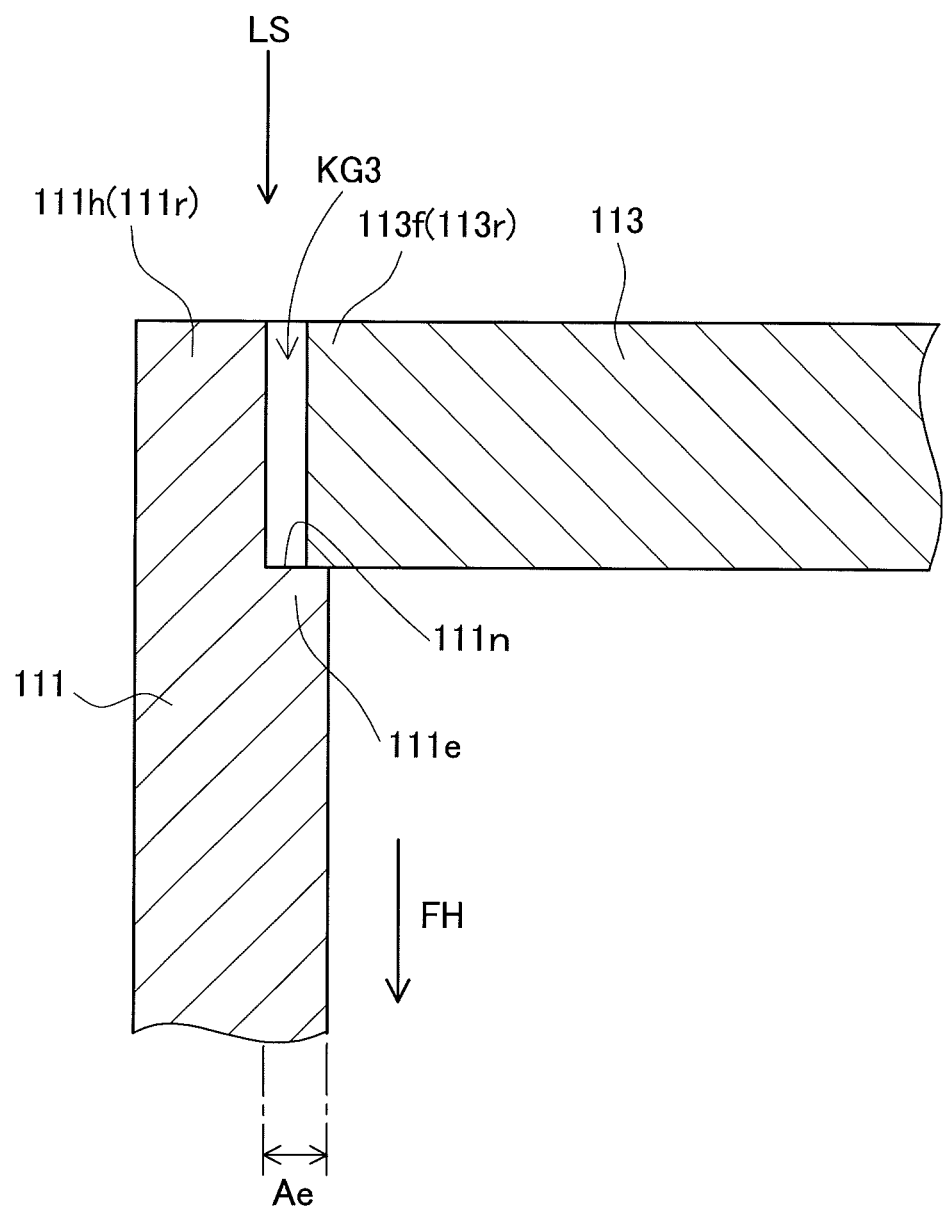
FIG. 12 is an explanatory view showing the vicinity of the opening rounded portion and the lid rounded portion, taken along a line F-F in FIG. 9 in the embodiment.

The opening long-side portions 111*a*, 111*a* and the lid long-side portions 113*a*, 113*a* are in close contact with each other without forming clearances. In contrast, the opening short-side portions 111*b*, 111*b* and the lid short-side portions 113*b*, 113*b* are apart from each other with a small clearance KG2. The opening rounded portions 111*r*, 111*r* and the lid rounded portions 113*r*, 113*r* are apart from each other with a clearance KG3 larger than the clearance KG2. A curvature radius r2 (see FIG. 9) of each of the lid rounded portions 113*r*, 113*r* is set to be larger than a curvature radius r1 of each of the opening rounded portions 111*r*, 111*r*. Accordingly, the clearance KG3 can be reliably provided between each corresponding opening rounded portion 111*r* and the corresponding lid rounded portion 113*r*.

The support projecting portion 111*e* of each opening rounded portion 111*r* mentioned above has a projecting size Ae set larger than the clearance G3 between the opening rounded portion 111*r* and the lid rounded portion 113*r*. Furthermore, the low projecting portion 111*d* of the opening short-side portion 111*b* has a projecting size Ad set larger than the clearance KG2 between the opening short-side portion 111*b* and the lid short-side portion 113*b*.

The main body member 111 and the lid member 113 are joined to each other by welding. To be specific, the opening portion 111*h* of the main body member 111 and the lid peripheral edge portion 113*f* of the lid member 113 are welded to each other over the entire circumference by an energy beam LS (concretely, a laser beam) irradiated to the lid member 113 from outside (from above the lid member 113) in the thickness direction of the lid member 113. Specifically, the opening portion 111*h* and the lid peripheral edge portion 113*f* are hermetically joined to each other through a melt-solidified portion 112 having a rectangular frame shape in plan view formed in such a way that part of the opening portion 111*h* and part of the lid peripheral edge portion 113 are melted once and then solidified.

As explained above, in the battery case 110 of the battery 100, the lid member 113 inserted in the opening portion 111*h* of the main body member 111 is supported in the opening portion 111*h* by engagement of the support projecting portions 111*e*, 111*e* of the opening rounded portions 111*r*, 111*r* with the lid rounded portions 113*r*, 113*r*. The opening short-side portions 111*b*, 111*b* include the low projecting portions 111*d*, 111*d* so that each low projecting portion 111*d* is positioned lower than the support projecting portions 111*e*. Accordingly, the low projecting portions 111*d* do not contact with the lid short-side portions 113*b* of the lid member 113 and thus do not interfere with supporting the lid member 113 by the opening rounded portions 111*r*. Thus, the position of the lid member 113 in the depth direction FH is not changed. Therefore, the position of the lid member 113 in the depth direction FG can be appropriately determined and subjected to welding.

In addition, each support projecting portion 111*e* of the opening rounded portion 111*r* projects inward over the entire opening rounded portion 111*r* in the circumferential direction SH. Therefore, when the energy beam LS is irradiated to the opening rounded portion 111*r* and the lid rounded portion 113*r* from outside in the thickness direction of the lid member 113 to weld the rounded portions 111*r* and 113*r*, this energy beam LS impinges on the support projecting portion 111*e* even when the energy beam LS enters the main body member 111 through the clearance KG3 between the rounded portions 111*r* and 113*r*. This can prevent the energy beam LS from directly entering the main body member 111. It is accordingly possible to reduce defects such as damage to the electrode body 120 due to entrance of the energy beam LS in the main body member 111 during welding of the rounded portions 111*r* and 113*r*.

Furthermore, the low projecting portion 111*d* of the opening short-side portion 111*b* projects inward over the entire opening short-side portion 111*b* in the circumferential direction SH. Accordingly, when the energy beam LS is irradiated to the lid member 113 from outside in the thickness direction thereof to weld the opening short-side portion 111*b* and the lid short-side portion 113*b*, the energy beam LS impinges on the low projecting portion 111*d* even when this energy beam LS enters the main body member 111 through the clearance KG2 generated between the opening short-side portion 111*b* and the lid short-side portion 113*b*. This can prevent the energy beam LS from directly entering the main body member 111. It is accordingly possible to reduce defects such as damage to the electrode body 120 due to entrance of the energy beam LS in the main body member 111 during welding the opening short-side portion 111*b* and the lid short-side portion 113*b*.

On the other hand, each opening long-side portion 111*a* has no portion projecting inward. In this battery 100, however, the opening long-side portions 111*a* and the lid long-side portions 113*a* held in close contact with each other are hermetically welded to each other over the entire circumference of the lid member 113. This can prevent entrance of the energy beam LS in the main body member 111 during welding. In this battery 100, therefore, even though it has the clearances KG3 between the opening rounded portions 111*r* and the lid rounded portions 113*r* and the clearances KG2 between the opening short-side portions 111*b* and the lid short-side portions 113*b*, it is possible to reduce defects such as damage to the electrode body 120 caused by entrance of the energy beam LS.

In the battery 100, furthermore, the projecting size Ae of each support projecting portion 111*e* is set to be larger than each of the clearances KG3 between the opening rounded portions 111*r* and the lid rounded portions 113*r* and also the projecting size Ad of each low projecting portion 111*d* is set to be larger than each of the clearances KG2 between the opening short-side portions 111*b* and the lid short-side portions 113*b*. Accordingly, the energy beam LS irradiated to the lid member 113 from outside in the thickness direction thereof during welding always impinges on the support projecting portions 111*e* and the low projecting portions 111*d*. It is therefore possible to effectively prevent the energy beam LS from directly entering the main body member 111, which may cause defects such as damage to the electrode body 120. Thus, the battery can provide high reliability.

In the battery 100, each of the low projecting portions 111*d* includes the low slant surface 111*m* over the entire opening short-side portion 111*b* in the circumferential direction SH. This low slant surface 111*m* is positioned lower than the support flat surfaces 111*n* of the support projecting portions 111*e* and hence does not contact with the lid member 113. Thus, the low projecting portion 111*d* does not change the position of the lid member 113 in the depth direction FH. On the other hand, the two support projecting portions 111*e*, 111*e* and the low projecting portion 111*d* interposed between them are configured such that the low slant surface 111*m* is interposed between the two support flat surfaces 111*n* and 111*n*. Therefore, even though the low slant surface 111*m* is formed, differences in position and shape from the two support flat surfaces 111*n* and 111*n* can be reduced. It is therefore possible to easily form one low slant surface 111*m* between two support flat surfaces 111*n* and 111*n* by squeezing work, press work, or others. This can produce the main body member 111 at low cost and hence the battery 100 at low cost. In addition, since the inclination angle α of each low slant surface 111*m* is set to 45 degrees or less, the energy beam LS reflected by each low slant surface 111*m* during welding is less likely to enter the main body member 111. Consequently, a battery with the electrode body 120 appropriately prevented from damages can be achieved.

A method for manufacturing the above battery 100 will be explained below. Firstly, the lid member 113, the first terminal members 151, 161, the second terminal members 152, 162, and the fastening members 155, 164, the first insulating members 157, 167, and the second insulating members 158, 168 are prepared respectively. By use of them, the positive terminal 150 and the negative terminal 160 are each fixed to the lid member 113 (see FIG. 3).

Secondly, the positive terminal 150 and the negative terminal 160 are each connected (welded) to the electrode body 120 separately produced. The main body member 111 is also prepared. In an insertion-support step, the electrode body 120 is put in the main body member 111 and also the lid member 113 is inserted in the opening portion 111*h* of the main body member 111 (see FIGS. 9 to 12). The lid rounded portions 113*r*, 113*r* of the lid member 113 are respectively supported on the support projecting portions 111*e*, 111*e* of the opening rounded portions 111*r*, 111*r* of the main body member 111.

At that time, the clearance is generated over the entire circumference between the opening portion 111*h* of the main body member 111 and the lid peripheral edge portion 113*f* of the lid member 113. To be concrete, the opening long-side portions 111*a*, 111*a* and the lid long-side portions 113*a*, 113*a* are spaced apart from each other with the clearances KG1. The opening short-side portions 111*b*, 111*b* and the lid short-side portions 113*b*, 113*b* are spaced apart from each other with the clearances KG2. The opening rounded portions 111*r*, 111*r* and the lid rounded portions 113*r*, 113*r* are spaced apart from each other with the clearances KG3. With the configuration that the clearances KG1, KG2, and KG3 are formed as above, it is possible in the insertion-support step to prevent the opening portion 111*h* and the lid peripheral edge portion 113*f* from colliding or strongly contacting with each other and thereby avoid the generation of foreign substances such as metal powder.

As mentioned above, the projecting size Ae of the support projecting portion 111*e* of each opening rounded portion 111*r* is larger than the clearance KG3 between each opening rounded portion 111*r* and the corresponding lid rounded portion 113*r*. The projecting size Ad of the low projecting portion 111*d* of each opening short-side portion 111*b* is larger than the clearance KG2 between each opening short-side portion 111*b* and the corresponding lid short-side portion 113*b*. In a welding step mentioned later, therefore, it is possible to prevent the energy beam LS from directly entering the main body member 111 through the clearances KG3 and KG2.

Figure 13:
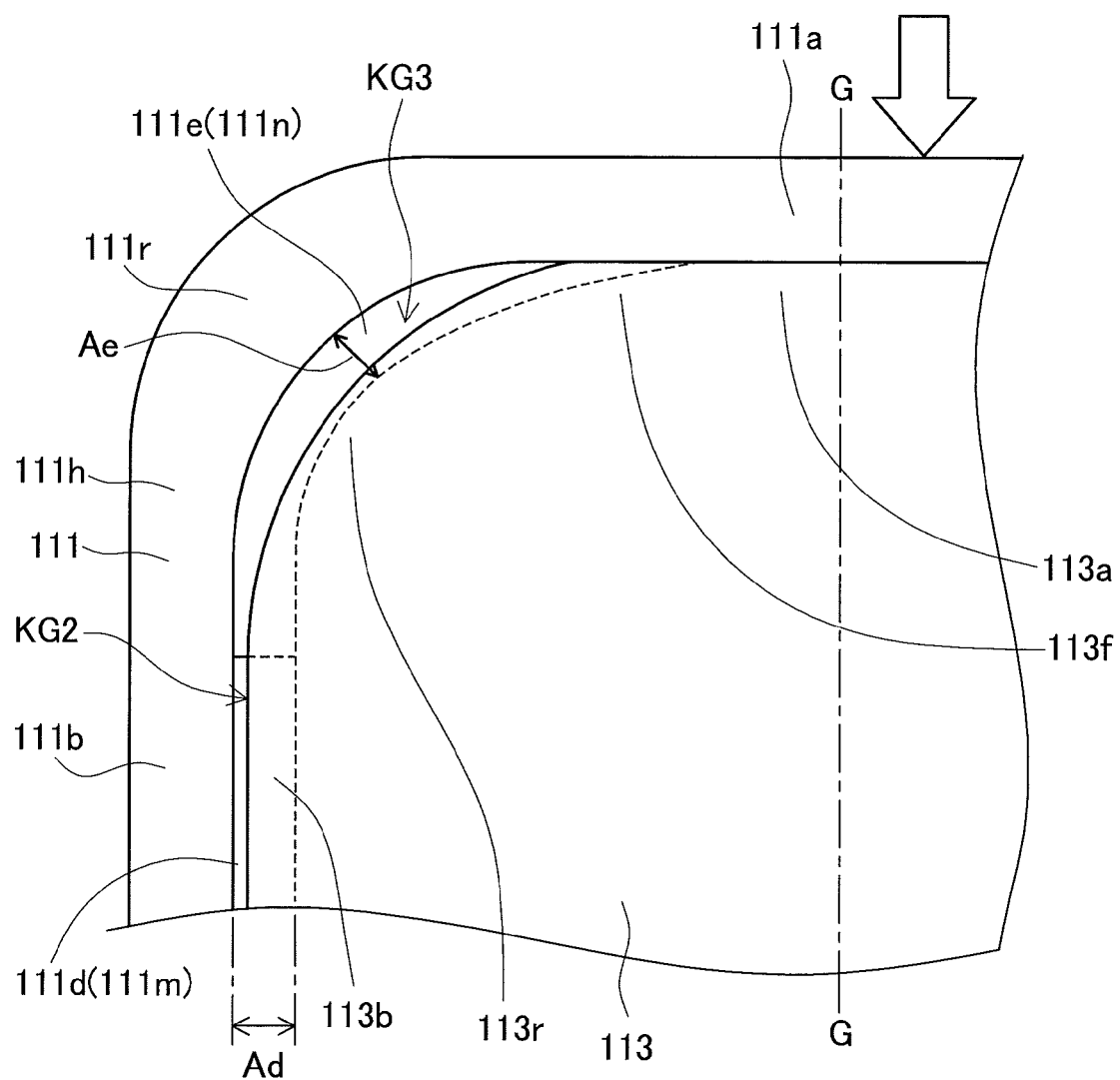
FIG. 13 is an explanatory view showing a state where the opening long-side portion and the lid long-side portion are made close contact with each other by compressing a pair of opening long-side portions against each other prior to welding, in the embodiment.
Figure 14:
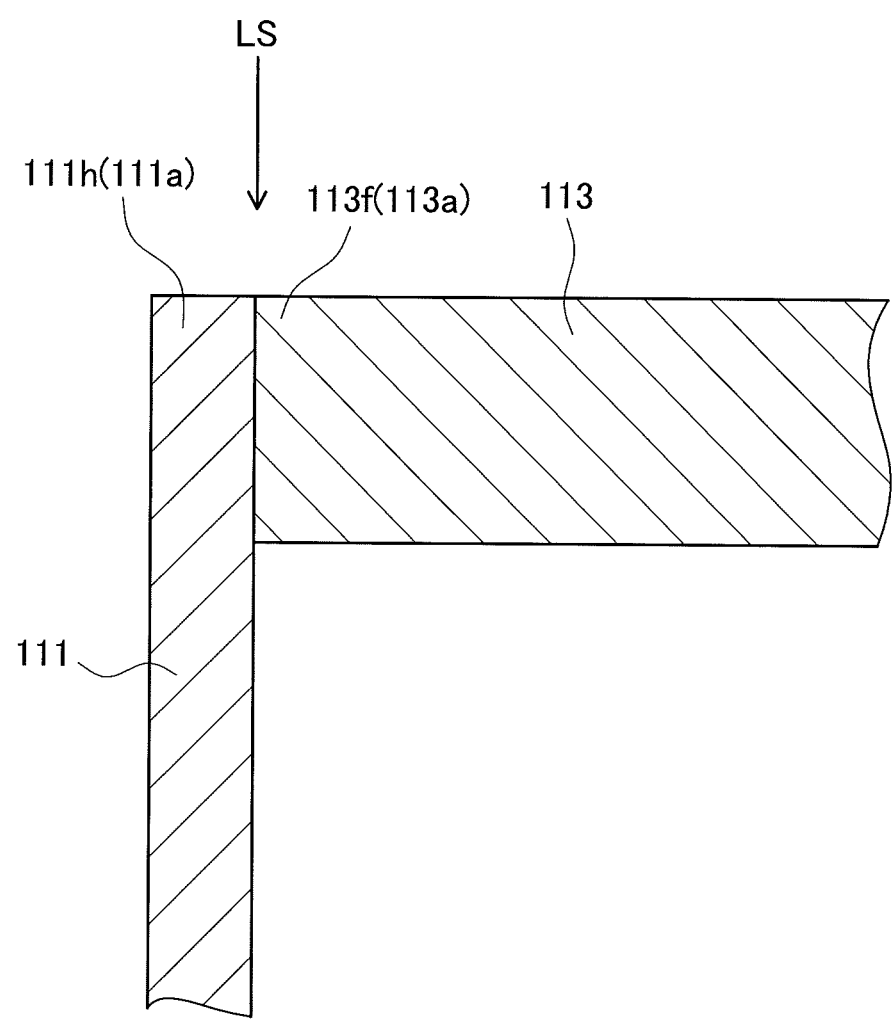
FIG. 14 is an explanatory view showing the vicinity of the opening long-side portion and the lid long-side portion, taken along a line G-G in FIG. 13, in the embodiment.

In the welding step, successively, a pair of opening long-side portions 111*a*, 111*a* of the main body member 111 are pressed inward (the opening long-side portions 111*a*, 111*a* are compressed to each other) prior to welding, thereby respectively bringing the opening long-side portions 111*a*, 111*a* into close contact with the pair of lid long-side portions 113*a*, 113*a* of the lid member 113 (see FIGS. 13 and 14). Thereafter, while maintaining this state, the energy beam (concretely, a laser beam) LS is irradiated to the lid member 113 from outside in the thickness direction thereof (i.e., from above the lid member 113), more concretely, in a direction perpendicular to the lid member 113, to weld the opening portion 111*h* of the main body member 111 and the lid peripheral edge portion 113*f* of the lid member 113 over the entire circumference.

For this irradiation of the laser beam LS, a fiber laser using an optical fiber as a medium is used as a CW laser (Continuous wave laser) that continuously emits a laser beam. Accordingly, part of the opening portion 111*h* and part of the lid peripheral edge portion 113*f* are melted and then solidified, forming the melt-solidified portion 112 having a rectangular frame shape in plan view. The opening portion 111*h* and the lid peripheral edge portion 113*f* are hermetically joined to each other over the entire circumference through this melt-solidified portion 112.

Subsequently, the electrolyte 117 is poured into the battery case 110 through the liquid inlet 113*h* and then this liquid inlet 113*h* is hermetically sealed by the sealing member 115. Thereafter, this battery 100 is subjected to initial charge, aging, and various tests. The battery 100 is thus completed.

As explained above, in the insertion-support step of the method for manufacturing the battery 100, when the lid member 113 is inserted in the opening portion 111*h* of the main body member 111, the support projecting portions 111*e*, 111*e* of the opening rounded portions 111*r*, 111*r* are engaged with the lid rounded portions 113*r*, 113*r*, so that the lid member 113 is supported within the opening portion 111*h*. The opening short-side portions 111*b*, 111*b* respectively have the low projecting portions 111*d*, 111*d*, each low projecting portion 111*d* being positioned lower than the support projecting portions 111*e*. Accordingly, the low projecing portions 111*d* neither contact with the lid short-side portions 113*b* of the lid member 113 nor interfere with supporting the lid member 113 by the opening rounded portions 111*r*, and therefore does not change the position of the lid member 113 in the depth direction FH. Thus, the welding step can be performed with the position of the lid member 113 in the depth direction FH appropriately determined.

In addition, the support projecting portion 111*e* of each opening rounded portion 111*r* projects inward over each entire opening rounded portion 111*r* in the circumferential direction SH. In the welding step, therefore, when the energy beam LS is irradiated to the lid member 113 from outside in the thickness direction thereof while the clearance KG3 is generated between each opening rounded portion 111*r* and the corresponding lid rounded portion 113*r* to weld the rounded portions 111*r* and 113*r*, this energy beam LS impinges on the support projecting portions 111*e*. This can prevent the energy beam LS from directly entering the main body member 111. It is accordingly possible to reduce defects such as damage to the electrode body 120 due to entrance of the energy beam LS in the main body member 111 during welding of the rounded portions 111*r* and 113*r*.

In addition, the low projecting portion 111*d* of each opening short-side portion 111*b* also projects inward over each entire opening short-side portion 111*b* in the circumferential direction SH. In the welding step, therefore, the laser beam LS is irradiated to the lid member 113 from outside in the thickness direction while the clearance KG2 is generated between each opening short-side portion 111*b* and the corresponding lid short-side portion 113*b* to weld the short-side portions 111*b* and 113*b*, this energy beam impinges on the low projecting portion 111*d*. Accordingly, this can also prevent the energy beam LS from directly entering the main body member 111. Thus, during welding of the opening short-side portions 111*b* and the lid short-side portions 113*b*, it is possible to prevent defects such as damage to the electrode body 120 due to entrance of the energy beam LS in the main body member 111. As above, even though the clearances KG3 and KG2 are provided respectively between the opening rounded portion 111r and the lid rounded portion 113r and between the opening short-side portion 111b and the lid short-side portion 113b, the rectangular battery 100 can be manufactured by preventing defects such as damage to the electrode body 120 due to entrance of the energy beam LS.

According to the method for manufacturing the battery 100, moreover, the projecting size Ae of each support projecting portion 111e is set larger than the clearance KG3 between each opening rounded portion 111r and the corresponding lid rounded portion 113r and also the projecting size Ad of each low projecting portion 111d is set larger than the clearance KG2 between each opening short-side portion 111b and the corresponding lid short-side portion 113b. In the welding step, therefore, the energy beam LS irradiated to the lid member 113 from outside in the thickness direction thereof always impinges on the support projecting portion 111e and the low projecting portion 111d. This can effectively suppress damage to the electrode body 120 due to direct entrance of the energy beam LS into the main body member 111. Thus, the rectangular battery 100 can be manufactured with high reliability.

According to the battery 100 manufactured by the above manufacturing method, each low projecting portion 111d includes the corresponding low slant surface 111m over the entire opening short-side portion 111b in the circumferential direction SH. This low slant surface 111m is positioned lower than the support flat surfaces 111n of the support projecting portions 111e and hence does not contact with the lid member 113. Thus, the low projecting portion 111d does not change the position of the lid member 113 in the depth direction FH. On the other hand, the two support projecting portions 111e, 111e and the low projecting portion 111d interposed between them are configured such that the low slant surface 111m is interposed between the two support flat surfaces 111n, 111n. Therefore, even though the low slant surface 111m is formed, differences in position and shape from the two support flat surfaces 111n, 111n can be reduced. It is therefore possible to easily form one low slant surface 111m between two support flat surfaces 111n, 111n by squeezing work, press work, or others. This can produce the main body member 111 at low cost and hence the rectangular battery 100 at low cost. In addition, since the inclination angle α of each low slant surface 111m is set to be 45 degrees or less, the energy beam LS reflected by each low slant surface 111m during welding is less likely to enter the main body member 111. Consequently, the rectangular battery 100 with the electrode body 120 appropriately prevented from damages can be produced.

When the lid member 113 is to be inserted in the opening portion 111h of the main body member 111 in the insertion-support step, if the lid peripheral edge portion 113f of the lid member 113 collides or strongly contacts with the opening portion 111h, foreign subjects such as metal powder may occur and drop in the main body member 111, which may cause short circuit or the like. In the present embodiment, therefore, in a case where the main body member 111 is in a free state with no pressure or restraint, the clearance KG1 is generated between each opening long-side portion 111a and the corresponding lid long-side portion 113a. During welding of the opening portion 111h and the lid peripheral edge portion 113f in this state, therefore, the energy beam LS may directly enter the main body member 111 through the clearance KG1 between each opening long-side portion 111a and the corresponding lid long-side portion 113a and cause defects such as damage to the electrode body 120. In contrast, in the present embodiment, while each opening long-side portion 111a and the corresponding lid long-side portion 113a are placed in close contact with each other, the opening portion 111h and the lid peripheral edge portion 113f are hermetically welded to each other over the entire circumference. Accordingly, the energy beam LS does not directly enter the main body member 111, thus enabling further reduction in possibility that defects such as damage to the electrode body 120.

The present invention is explained above along the embodiment but is not limited to the above embodiment. The present invention may be embodied in other specific forms without departing from the essential characteristics thereof.

REFERENCE SIGNS LIST

100 Lithium ion secondary battery (Rectangular battery)
110 Battery case
111 Main body member
111h Opening portion
111a Opening long-side portion
111b Opening short-side portion
111r Opening rounded portion
111d Low projecting portion
111m Low slant surface
111e Support projecting portion
111n Support flat surface
112 Melt-solidified portion
113 Lid member
113f Lid peripheral edge portion
113a Lid long-side portion
113b Lid short-side portion
113r Lid rounded portion
120 Electrode body
150 Positive terminal (Positive terminal member)
160 Negative terminal (Negative terminal member)
Ae Projecting size (of Support projecting portion)
Ad Projecting size (of Low projecting portion)
KG1, KG2, KG3 Clearance
LS Energy beam (Laser beam)
FH Depth direction (of Main body member)
SH Circumferential direction (of Opening portion)

The invention claimed is:

1. A rectangular battery including a rectangular parallelepiped battery case made of metal and an electrode body enclosed in the battery case,
   wherein the battery case includes:
   a bottom-closed rectangular cylindrical main body member having a rectangular opening portion defined by a pair of opening long-side portions, a pair of opening short-side portions, and four opening rounded portions each curved to connect the opening long-side portions to the opening short-side portions; and
   a rectangular plate-like lid member inserted in the opening portion to close the opening portion, the lid member including a lid peripheral edge portion defined by a pair of lid long-side portions placed respectively to face the pair of opening long-side portions, a pair of lid short-side portions placed respectively to face the pair of opening short-side portions, and four lid rounded portions placed respectively to face the four opening rounded portions,
   wherein, in the opening portion of the main body member, the four opening rounded portions each include a support projecting portion projecting inward over the corresponding entire opening rounded portion in a circumferential direction of the opening portion to support the lid member inserted in the opening portion, the pair of opening short-side portions each include a low projecting portion projecting inward over the entire opening short-side portion in the circumferential direction of the opening portion, each of the low projecting portions being positioned lower in a depth direction of the main body member than the support projecting portions, the four opening rounded portions and the four lid rounded portions have clearances one each between each opening rounded portion and the corresponding lid rounded portion, and are welded to each other by an energy beam irradiated to the lid member from outside in a thickness direction of the lid member, and the pair of opening short-side portions and the pair of lid short-side portions have a clearance at least either between the one opening short-side portion and the one lid short-side portion or between the other opening short-side portion and the other lid short-side portion, and are welded to each other by the energy beam.

2. The rectangular battery according to claim 1, wherein
the support projecting portions each have a projecting size larger than the clearance between each opening rounded portion and the corresponding lid rounded portion, and
the low projecting portions each have a projecting size larger than the clearance between each opening short-side portion and the corresponding lid short-side portion.

3. The rectangular battery according to claim 1, wherein
the support projecting portions each include a support flat surface extending perpendicular to the depth direction over each entire opening rounded portion in the circumferential direction to support the lid member,
the low projecting portions each include a low slant surface projecting obliquely inward from a same position as the support flat surfaces over each entire opening short-side portion in the circumferential direction so that position of the low slant surface in the depth direction is lower on a more inward side, and
each low slant surface forms an angle α with the support flat surface is 45 degrees or less.

4. The rectangular battery according to claim 1, wherein the opening portion of the main body member and the lid peripheral edge portion of the lid member are hermetically welded to each other over the entire circumference of the lid member while the pair of the opening long-side portions and the pair of the lid long-side portions are placed in close contact with each other.

5. A method for manufacturing a rectangular battery including a rectangular parallelepiped battery case made of metal and an electrode body enclosed in the battery case,
wherein the battery case includes:
a bottom-closed rectangular cylindrical main body member having a rectangular opening portion defined by a pair of opening long-side portions, a pair of opening short-side portions, and four opening rounded portions each curved to connect the opening long-side portions to the opening short-side portions; and
a rectangular plate-like lid member inserted in the opening portion to close the opening portion, the lid member including a lid peripheral edge portion defined by a pair of lid long-side portions placed respectively to face the pair of opening long-side portions, a pair of lid short-side portions placed respectively to face the pair of opening short-side portions, and four lid rounded portions placed respectively to face the four opening rounded portions, wherein, in the opening portion of the main body member,
the four opening rounded portions each include a support projecting portion projecting inward over the corresponding entire opening rounded portion in a circumferential direction of the opening portion to support the lid member inserted in the opening portion, the pair of opening short-side portions each include a low projecting portion projecting inward over the entire opening short-side portion in the circumferential direction of the opening portion, each of the low projecting portions being positioned lower in a depth direction of the main body member than the support projecting portions, the four opening rounded portions and the four lid rounded portions have clearances one each between each opening rounded portion and the corresponding lid rounded portion, and are welded to each other by an energy beam irradiated to the lid member from outside in a thickness direction of the lid member, and the pair of opening short-side portions and the pair of lid short-side portions have a clearance at least either between the one opening short-side portion and the one lid short-side portion or between the other opening short-side portion and the other lid short-side portion, and are welded to each other by the energy beam, wherein the method includes:
an insertion-support step of inserting the lid member in the opening portion of the main body member so that the lid rounded portions of the lid member are supported by the support projecting portion of the opening rounded portions of the main body member; and
a welding step of irradiating the energy beam to respectively weld the four opening rounded portions to the four lid rounded portions, and respectively weld the pair of the opening short-side portions to the lid short-side portions, while the clearances are generated one each between the four opening rounded portions and the four lid rounded portions and the clearance is generated at least either between the one opening short-side portion and the one lid short-side portion or between the other opening short-side portion and the other lid short-side portion.

6. The method for manufacturing a rectangular battery according to claim 5,
wherein the support projecting portions each have a projecting size larger than the clearance between each opening rounded portion and the corresponding lid rounded portion, and
the low projecting portions each have a projecting size larger than the clearance between each opening short-side portion and the corresponding lid short-side portion.

7. The method for manufacturing a rectangular battery according to claim 5,
wherein the support projecting portions each include a support flat surface extending perpendicular to the depth direction over each entire opening rounded portion in the circumferential direction to support the lid member,
the low projecting portions each include a low slant surface projecting obliquely inward from a same position as the support flat surfaces over each entire opening short-side portion in the circumferential direction so that position of the low slant surface in the depth direction is lower on a more inward side, and each low slant surface forms an angle α with the support flat surface is 45 degrees or less.

8. The method for manufacturing a rectangular battery according to claim 5, wherein the welding step is a step of hermetically welding the opening portion and the lid peripheral edge portion over the entire circumference while the pair of opening long-side portions are compressed to each other so that the opening long-side portions and the lid long-side portions are placed in close contact with each other.

9. The rectangular battery according to claim 2, wherein the support projecting portions each include a support flat surface extending perpendicular to the depth direction over each entire opening rounded portion in the circumferential direction to support the lid member, the low projecting portions each include a low slant surface projecting obliquely inward from a same position as the support flat surfaces over each entire opening short-side portion in the circumferential direction so that position of the low slant surface in the depth direction is lower on a more inward side, and each low slant surface forms an angle α with the support flat surface is 45 degrees or less.

10. The rectangular battery according to claim 2, wherein the opening portion of the main body member and the lid peripheral edge portion of the lid member are hermetically welded to each other over the entire circumference of the lid member while the pair of the opening long-side portions and the pair of the lid long-side portions are placed in close contact with each other.

11. The rectangular battery according to claim 3, wherein the opening portion of the main body member and the lid peripheral edge portion of the lid member are hermetically welded to each other over the entire circumference of the lid member while the pair of the opening long-side portions and the pair of the lid long-side portions are placed in close contact with each other.

12. The rectangular battery according to claim 4, wherein the opening portion of the main body member and the lid peripheral edge portion of the lid member are hermetically welded to each other over the entire circumference of the lid member while the pair of the opening long-side portions and the pair of the lid long-side portions are placed in close contact with each other.

13. The method for manufacturing a rectangular battery according to claim 6, wherein the support projecting portions each include a support flat surface extending perpendicular to the depth direction over each entire opening rounded portion in the circumferential direction to support the lid member, the low projecting portions each include a low slant surface projecting obliquely inward from a same position as the support flat surfaces over each entire opening short-side portion in the circumferential direction so that position of the low slant surface in the depth direction is lower on a more inward side, and each low slant surface forms an angle α with the support flat surface is 45 degrees or less.

14. The method for manufacturing a rectangular battery according to claim 6, wherein the welding step is a step of hermetically welding the opening portion and the lid peripheral edge portion over the entire circumference while the pair of opening long-side portions are compressed to each other so that the opening long-side portions and the lid long-side portions are placed in close contact with each other.

15. The method for manufacturing a rectangular battery according to claim 7, wherein the welding step is a step of hermetically welding the opening portion and the lid peripheral edge portion over the entire circumference while the pair of opening long-side portions are compressed to each other so that the opening long-side portions and the lid long-side portions are placed in close contact with each other.

16. The method for manufacturing a rectangular battery according to claim 13, wherein the welding step is a step of hermetically welding the opening portion and the lid peripheral edge portion over the entire circumference while the pair of opening long-side portions are compressed to each other so that the opening long-side portions and the lid long-side portions are placed in close contact with each other.

* * * * *